(12) United States Patent
Ohki et al.

(10) Patent No.: US 7,311,505 B2
(45) Date of Patent: Dec. 25, 2007

(54) APPARATUS FOR MANUFACTURING RUBBER STRIP

(75) Inventors: Masahiko Ohki, Kobe (JP); Isao Ohiwa, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 124 days.

(21) Appl. No.: 11/102,696

(22) Filed: Apr. 11, 2005

(65) Prior Publication Data

US 2005/0271761 A1   Dec. 8, 2005

(51) Int. Cl.
  *B29C 47/06*   (2006.01)
  *B29C 47/14*   (2006.01)
(52) U.S. Cl. ............... 425/133.5; 425/188; 425/192 R; 425/462
(58) Field of Classification Search ............. 425/133.5, 425/188, 192 R, 462
   See application file for complete search history.

(56) References Cited

U.S. PATENT DOCUMENTS 4,548,568 A * 10/1985 Herbert et al. ........... 425/131.1
4,619,599 A * 10/1986 Herbert et al. ............. 425/186
4,799,874 A * 1/1989 Bellmer et al. .......... 425/131.1
6,695,606 B1 * 2/2004 Burg et al. ............... 425/133.5

OTHER PUBLICATIONS

The Rubber Machinery Guide Book—1998, p. 152.

* cited by examiner

Primary Examiner—James P. Mackey
Assistant Examiner—Joseph Leyson
(74) Attorney, Agent, or Firm—Birch, Stewart, Kolasch & Birch, LLP

(57) ABSTRACT

An apparatus for manufacturing a strip of rubber compounds comprises four extruders (2a, 2b, 2c, 2d) and a single extruder head (3). The extruder head (3) comprises an extruder die assembly (6) and a main body (4). The main body (4) is composed of a pair of laterally-spaced lateral blocks (11), a central block (10) disposed between the lateral blocks, and a pair of laterally-spaced sub blocks (13) disposed beneath the lateral blocks (11). The central block (10) has a pair of V-form side faces (15) extending in a V-shaped formation down to lateral ends of the bottom face (S1). The lateral blocks (11) are each provided with an upper mount face (21U) and a lower mount face (21L) on which two of the four extruders are respectively attached. An upper preforming channel (24Ua, 24Ub) extending from an extruder to the die assembly has a parting plane along the V-form side face (15). A lower preforming channel (24Lc, 24Ld) extending from an extruder to the die assembly also has a parting plane.

7 Claims, 10 Drawing Sheets

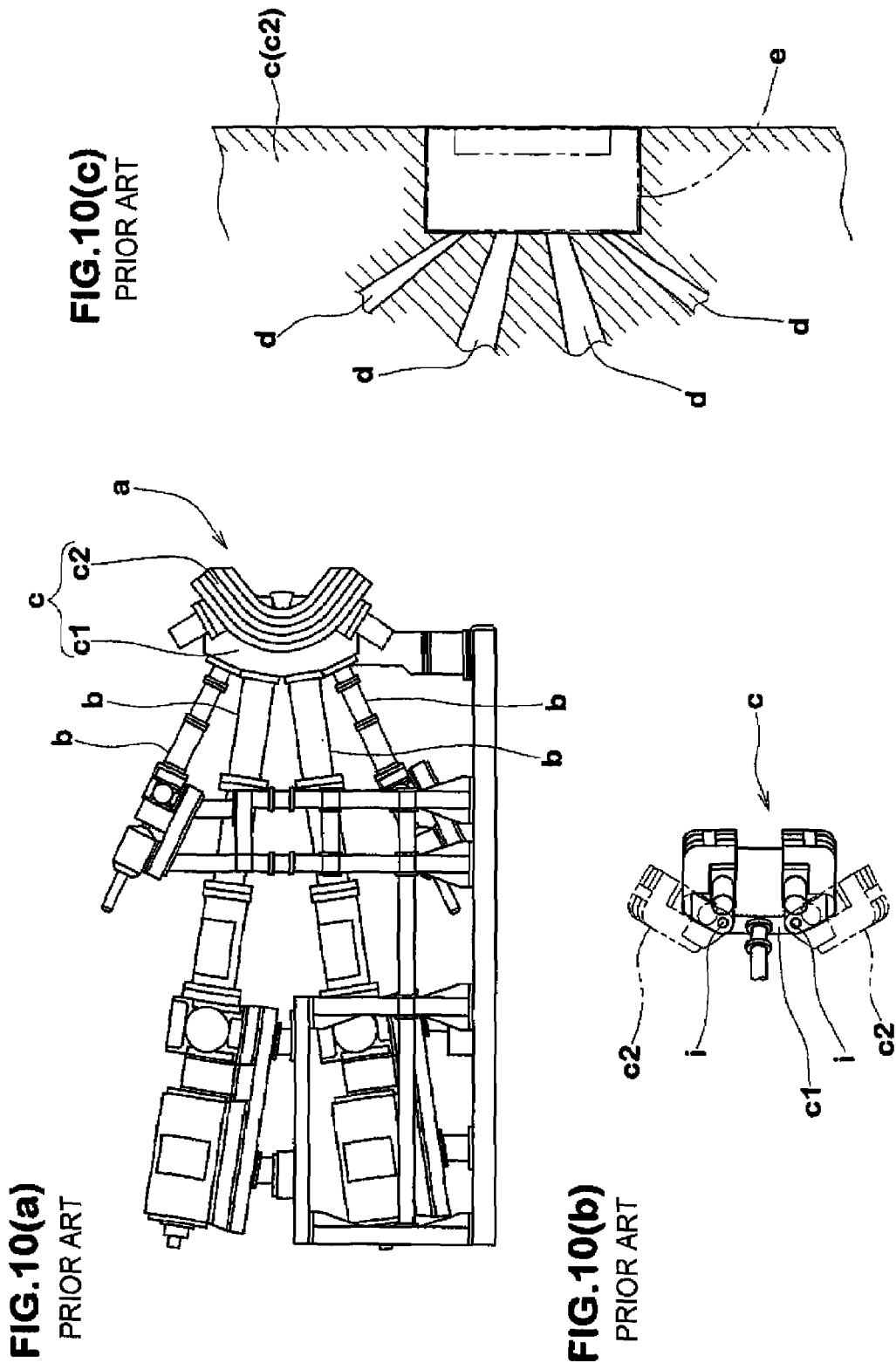

APPARATUS FOR MANUFACTURING RUBBER STRIP

FIELD OF THE INVENTION

The present invention relates to an apparatus for manufacturing a strip of rubber compounds comprising four extruders and one extruder head.

DESCRIPTION OF RELATED ART

In making a pneumatic tire for example, in order to reduce the manufacturing processes, manufacturing cost, equipment cost and the like, as shown in FIGS. 9(a) and 9(b), a rubber component G such as tread rubber G1 and sidewall rubber G2 formed from different rubber compounds ga, gb, gc and gd which form different sections Y (Ya, Yb, Yc, Yd) can be used to wind it directly or indirectly around a tire building drum.

An apparatus for extruding a four-layered rubber has been manufactured and marketed by "NAKATA Engineering Co., Ltd., Kobe Japan". The front, top and side views are disclosed in "The Rubber Machinery Guide Book 1998" on page 152 (Date of issuance: 15 Oct. 1997, Publisher: Posty corporation, Tokyo JAPAN). This apparatus, as shown in FIGS. 10(a) and 10(b), comprises four extruders (b) and one extruding head (c). The head (c) comprises a pair of movable parts (c2), and a base part (c1) immovably fixed to a support frame. The four extruders (b) are arranged vertically and the four ends thereof are attached to the base part (c1). The rubber compounds (g) fed from the extruders (b) are led to a extruder die (e) through passages (d) as shown in FIG. 10(c). The movable parts (c2) are each supported pivotally around a vertical axis (i) so as to be opened outward like a French window in order to clean up the passages (d) and do maintenance.

SUMMARY OF THE INVENTION

In this structure, the extruding pressure of all the rubber passages (d) is simultaneously applied to the movable parts (c2) causing a large force which opens the movable parts (c2). Thus, it is necessary to provide a large sized clamp, stopper or the like in order to stop the opening. Further, as the four extruders (b) are arranged vertically, the base part (c1) inevitably becomes large sized in order that the four ends can be attached. As a result, the total volume of the rubber compounds remained in the passages (d) without being used is increased.

SUMMARY OF THE INVENTION

It is therefore, an object of the present invention to provide an apparatus for manufacturing a strip of rubber compounds, in which the extruder head and its auxiliary equipment such as clamp and stopper can be reduced in size, to reduce equipment cost and waste of rubber compounds and also improve the maintainability, handling, cleaning of rubber passage and the like.

According to the present invention, an apparatus for manufacturing a strip of rubber compounds comprises:

four extruders of rubber compounds and a single extruder head having an extruding nozzle, the extruder head comprising an extruder die assembly and a main body provided with a recess in which said extruder die assembly is mounted, the main body composed of a pair of laterally-spaced lateral blocks each having an upper inner face and a lower inner face, and a central block disposed between the opposed upper inner faces of the lateral blocks, and a pair of laterally-spaced sub blocks disposed beneath the lateral blocks and having an upper face contacting said lower inner face, the central block having a bottom face and a pair of V-form side faces extending in a V-shaped formation down to lateral ends of the bottom face, the above-mentioned opposed upper inner faces of the lateral blocks extending in the same V-shaped formation as the V-form side faces so as to fit to the V-form side faces of the central block, the lateral blocks each provided with a tip end surface extending between the upper inner face and lower inner face and the sub blocks each provided with an inner side face extending from the upper face, and said recess formed as an open-bottom recess by the tip end surfaces, the inner side faces and the bottom face, the lateral blocks each provided on the other side of the upper inner face and lower inner face with an upper mount face and a lower mount face on which two of the four extruders are respectively attached, an upper preforming channel extending from each of the upper mount faces to the recess and having a parting plane between the V-form side face and upper inner face, and a lower preforming channel extending from each of the lower mount faces to the recess and having a parting plane between the lower inner face and upper face.

BRIEF DESCRIPTION OF THE DRAWINGS

Embodiments of the present invention will now be described in detail in conjunction with the accompanying drawings.

FIGS. 10(a), 10(b) and 10(c) show a four-layer extruder known in the prior art.

DETAILED DESCRIPTION OF THE INVENTION

Figure 1:
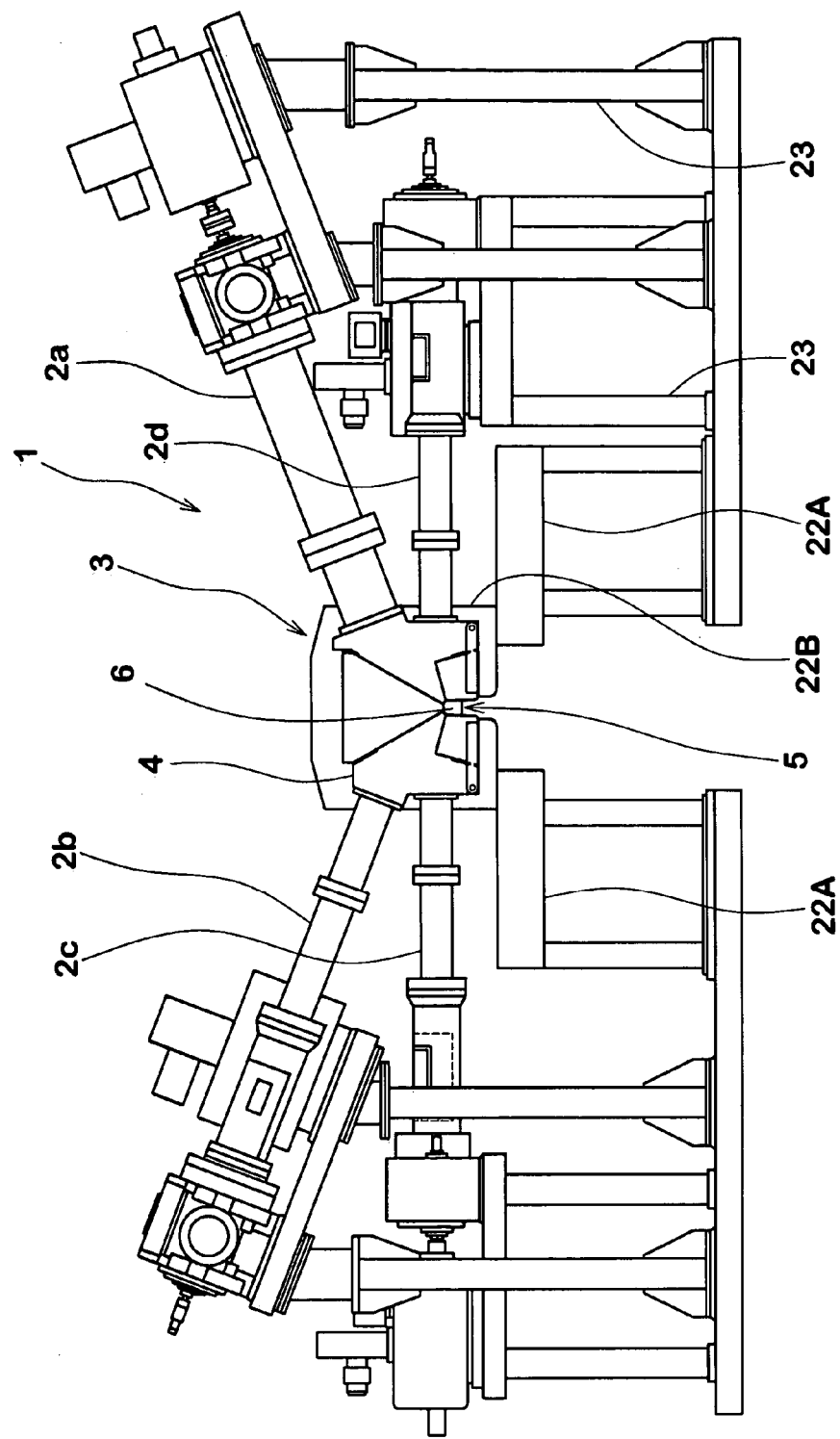
FIG. 1 is a front elevational view of an apparatus according to the present invention.

In the drawings, apparatus 1 according to the present invention comprises: four extruders 2a, 2b, 2c to 2d; and one extruder head 3 having four inlets coupled with the four extruders, respectively, and one outlet or extruding nozzle 41.

Thus, four (at the maximum) different kinds of rubber compounds ga, gb, gc and gd (generically "g") extruded from the four extruders 2a, 2b, 2c to 2d, respectively, are formed into one strip of the rubber compounds which are laminated in a specific manner and order substantially without being mixed.

Figure 9A:
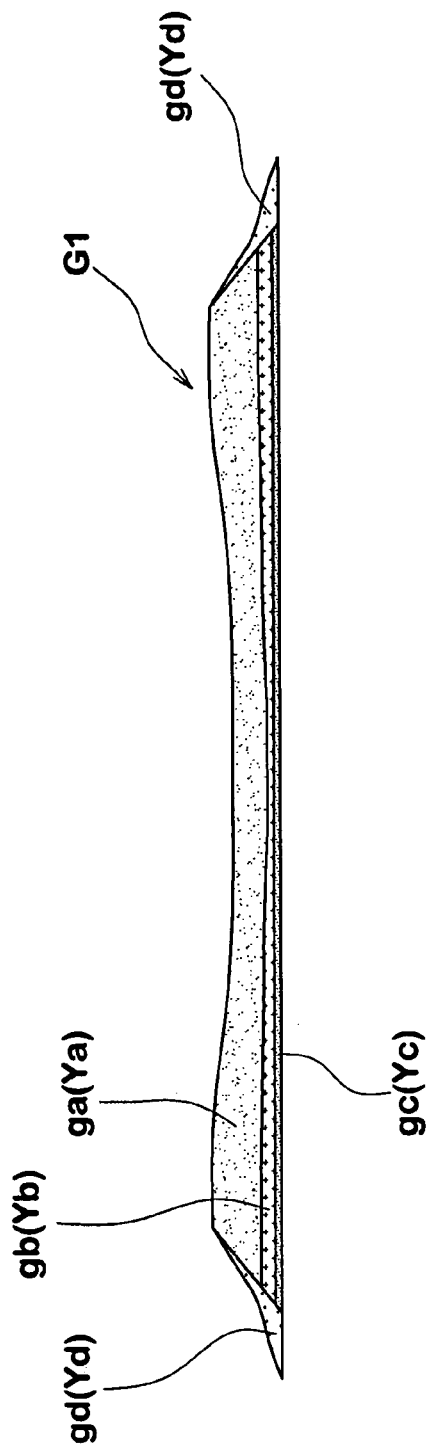
FIGS. 9(a) and 9(b) are cross sectional views of a tread rubber and a sidewall rubber, respectively, which can be used to make a pneumatic tire.
Figure 9B:
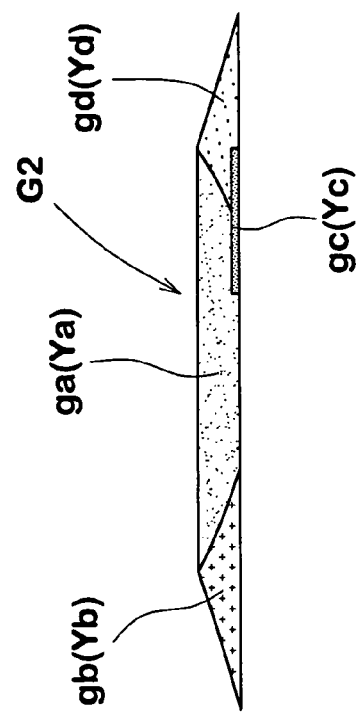

Examples of the rubber strip which can be made by the apparatus 1 are shown in FIGS. 9(a) and 9(b).

FIG. 9(a) shows a tread rubber G1 for a pneumatic tire having five sections Ya-Yd: a section Ya of a rubber compound ga so called cap tread rubber defining the tread face of the tire; a section Yb of a less heat build-up rubber compound gb so called tread base rubber extending along the underside of the cap tread rubber; a section Yc of a rubber compound gc so called under tread rubber being superior in adhesion to a tread reinforcing cord layer (such as belt, breaker and band) and extending along the underside of the tread base rubber to improve the adhesion between the cord layer and tread base rubber; and a pair of sections Yd of a rubber compound gd so called wing rubber to improve adhesion with sidewall rubber disposed on both sides of the tread. FIG. 9(b) shows a sidewall rubber G2 for a pneumatic tire having four sections Ya-Yd. In each example, the rubber strip G1, G2 has the sections formed from the different rubber compounds.

The extruder head 3 comprises: a head main body 4 to which the four extruders 2a-2d are connected; and a die assembly 6 for shaping, laminating and extruding the rubber compounds (g).

Figure 2:
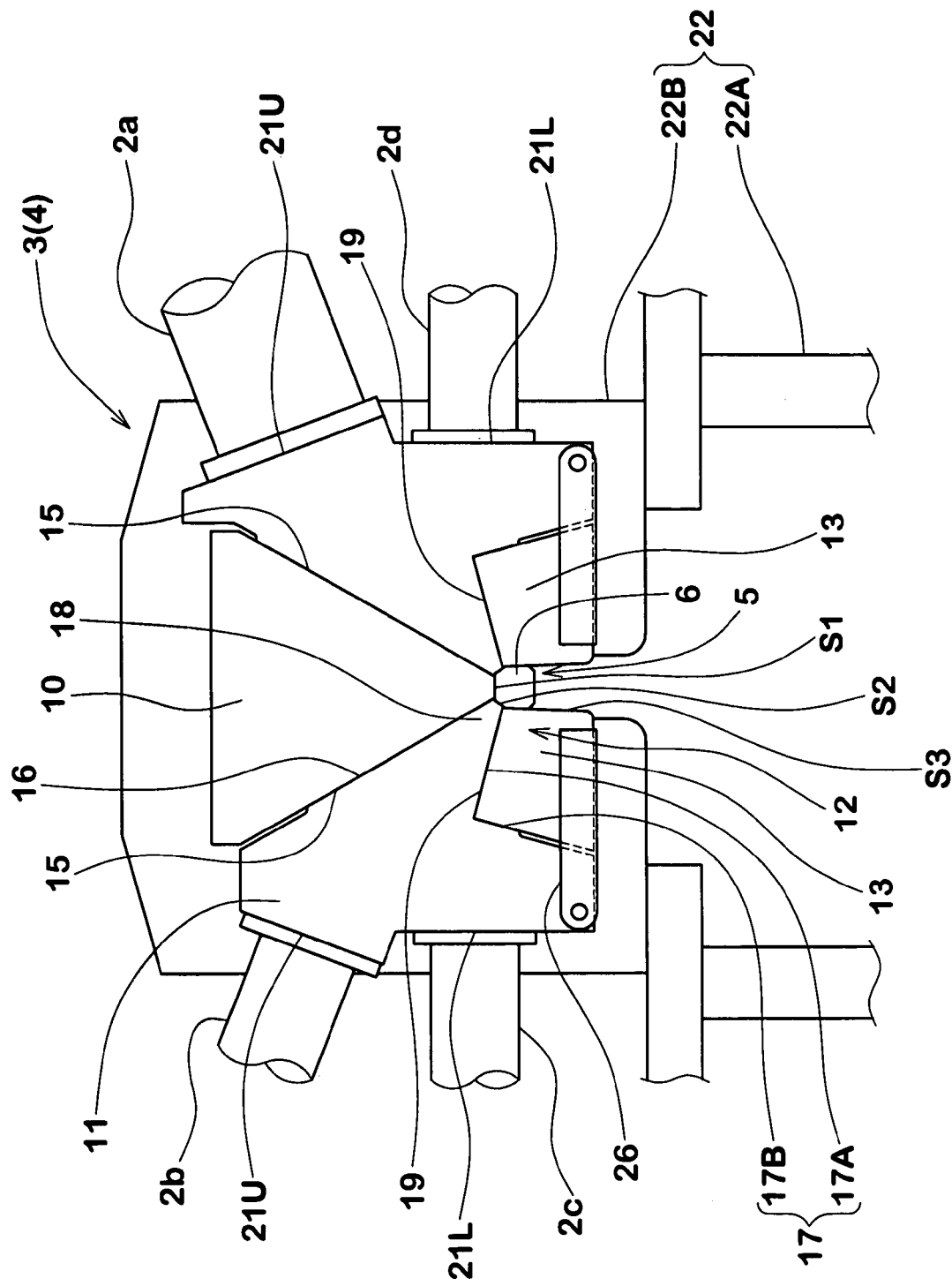
FIG. 2 is a front view of the extruder head thereof.

As shown in FIG. 2, the head main body 4 comprises five blocks: a V-shaped central block 10; a pair of lateral blocks 11; and a pair of sub blocks 13.

Figure 4:
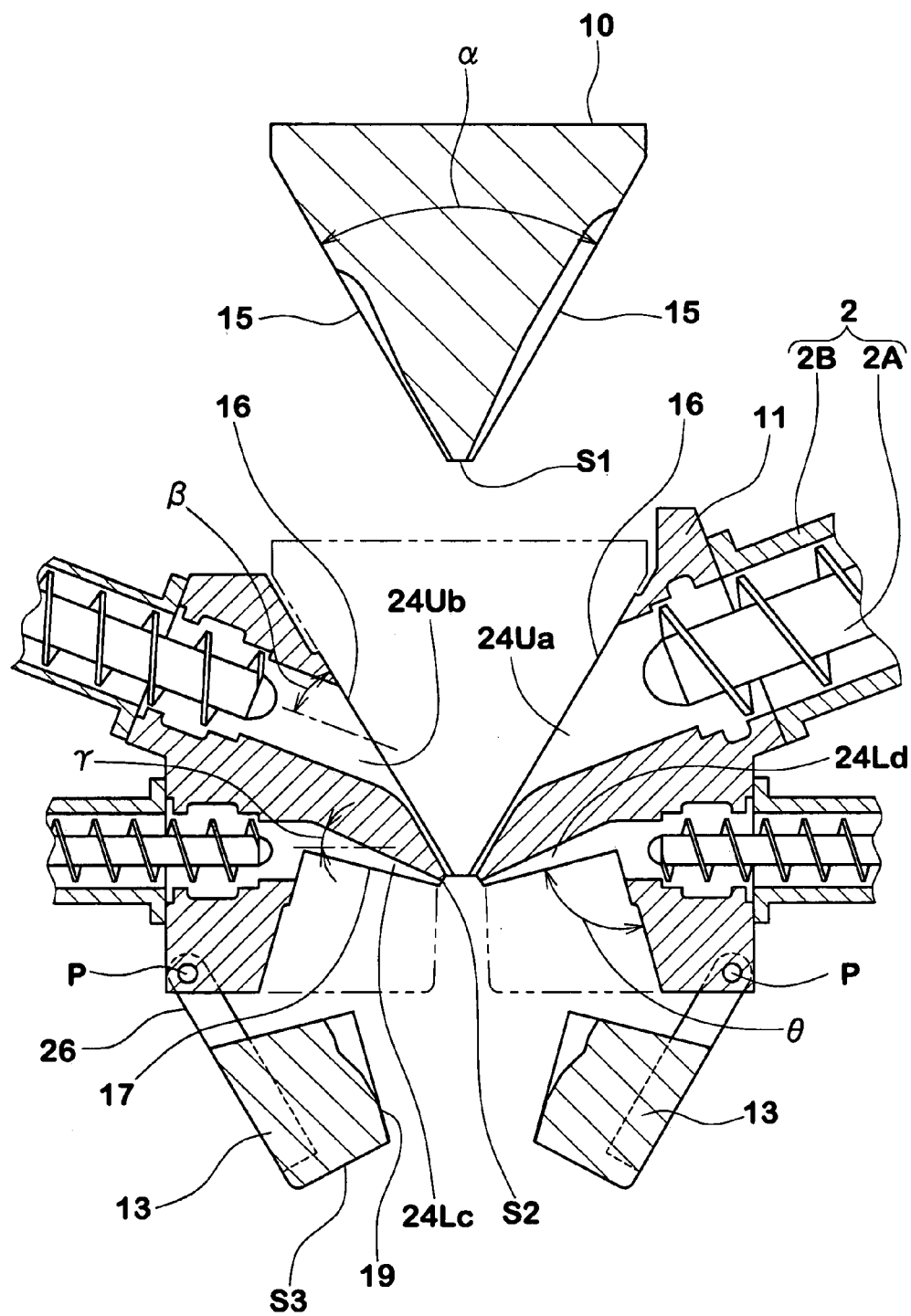
FIG. 4 is a cross sectional view of the extruder head showing a state in which preforming channels are opened.

In a transverse section as show in FIG. 4, the V-shaped central block 10 has: a small undersurface S1; and a pair of V-form side faces 15 extending in a V-shaped formation down to both of the lateral ends of the undersurface S1.

Each of the lateral blocks 11 has:
an upper inner face 16 contacting with one of the V-form side faces 15 of the V-shaped central block 10;
a tip end surface S2 extending from the lower end of the upper inner face 16 and inclining outside; and
a lower inner face 17 extending from the lower end of the tip end surface S2 and bent downwards at an angle theta.

As the lower inner face 17 is bent, it comprises:
a laterally extending inner part 17A extending from the lower end of the surface S2 while inclining towards the same direction as the V-form side face 15 but a different inclination angle from the V-form side face 15; and
a vertically extending outer part 17B intersecting with the laterally extending inner part 17A at the angle theta of 70 to 100 degrees. Thus, as best shown in FIG. 2, the lateral block 11 has a beaklike portion formed by the upper inner face 16, tip end surface S2 and laterally extending inner part 17A.

Underside of the beaklike portion, a space 12 for mounting the sub block 13 is formed between the bent parts 17A and 17B.

The sub block 13 has: an upper face 19 contacting with the lower inner face 17; and a side face S3.

Figure 3:
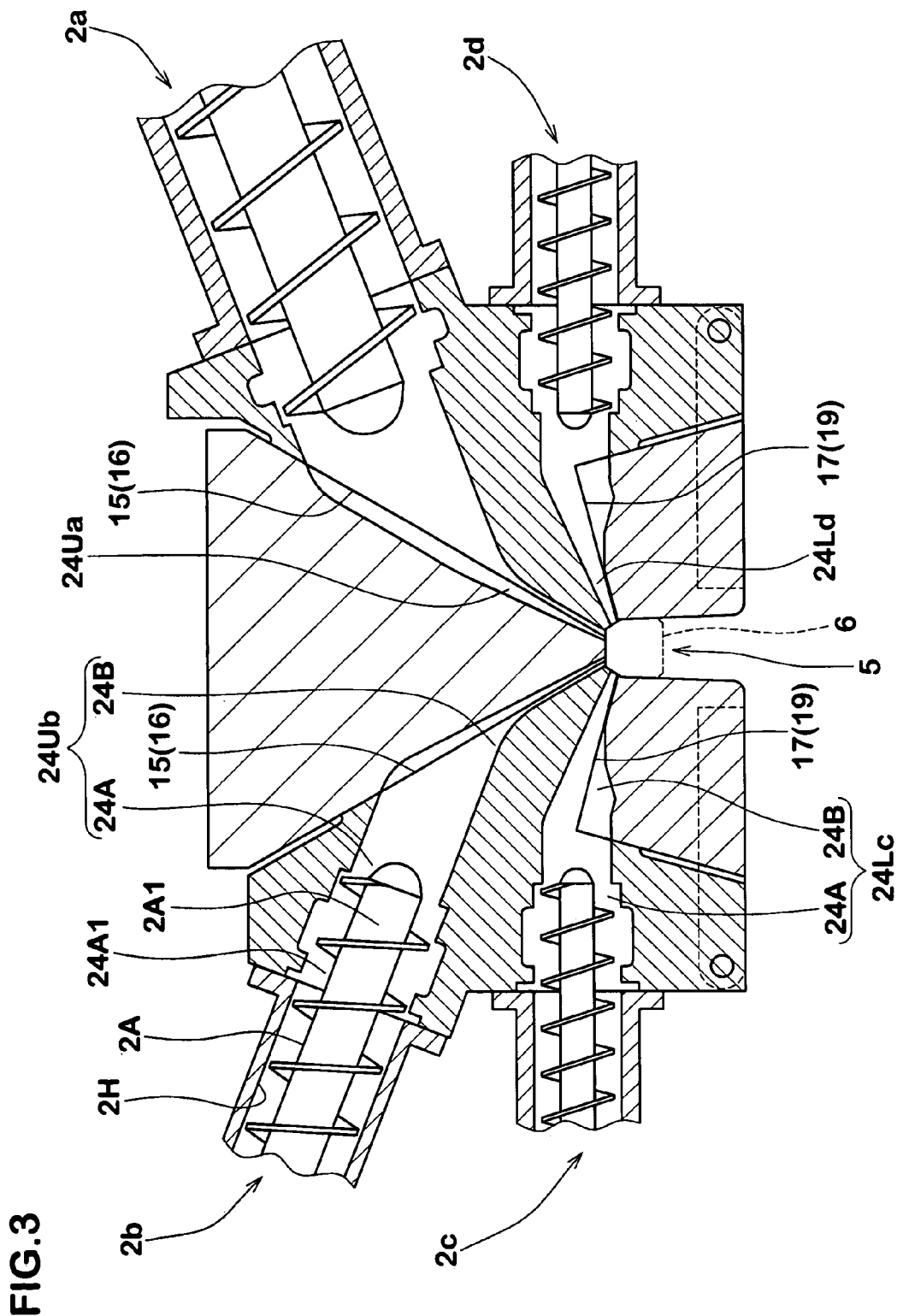
FIG. 3 is a cross sectional view thereof.

A recess 5 for mounting the die assembly 6 (hereinafter the "die assembly mounting recess 5") is formed by:
an upper inner face defined by the above-mentioned undersurface S1 which is a substantially horizontal face;
a pair of oblique inner faces defined by the above-mentioned tip end surfaces S2 which spread from the lateral ends of the upper inner face S1; and
a pair of inner faces defined by the side faces S3 which extending downwards from the lower ends of the oblique inner faces S2 in parallel with each other, whereby the recess 5 has a bottom-open irregular pentagonal shape as viewed from the front as shown in FIG. 3.

As shown in FIG. 2, the right-and-left lateral blocks 11 are each provided on its outer surface with two upper and lower mount faces 21U and 21L to which the two ends of two extruders (2a and 2d) or (2b and 2c) are respectively connected.

The upper and lower mount faces 21U and 21L are not parallel with each other, and in this example, a direction perpendicular to the lower mount face 21L is horizontal, but a direction perpendicular to the upper mount face 21U is inclined upwards.

The right-and-left lateral blocks 11 are supported immovably by a suitable means 22 for example, they are fixed to an upright frame 22B bridging between supporting tables 22A as shown in FIG. 1. Contrary, the V-shaped central block 10 and sub blocks 13 are movably supported.

In this embodiment, the V-shaped central block 10 is supported movably in the up-and-down direction from the lower closed position to the upper open position by means of an actuator (not shown), e.g. hydraulic cylinder, air cylinder or the like. As shown in FIG. 4, by moving the V-shaped central block 10 upwards to the upper open position (namely, maintenance work position), the V-form side faces 15 of the V-shaped central block 10 separate from the upper inner faces 16 of the lateral blocks 11. By moving downwards to the lower closed position (namely, normal operating position), the V-form side faces 15 tightly contact with the upper inner faces 16 as shown in FIG. 3.

Each of the sub blocks 13 is supported movably in the up-and-down direction from the upper closed position to the lower open position by suitable means such as links and the like.

In this example, links 26 are used, and one end P of each link 26 is pivoted to the lateral block 11.

By moving the sub blocks 13 downwards around the pivoted end P to the lower open position (namely, maintenance work position), the upper face 19 of each sub block 13 separates from the lower inner face 17 of the lateral block 11. By moving upwards to the upper closed position (namely, normal operating position), the upper face 19 tightly contacts with the lower inner face 17.

At the respective closed positions or normal operating positions, the V-shaped central block 10 and sub blocks 13 may be locked with suitable means such as clamp (not shown).

As to the extruders 2a-2d, a screw extruder is suitably used, which comprises: a cylinder 2B; and a screw 2A rotatablly supported therein for mixing and advancing rubber compound materials. Each of the extruders is supported by stands 23 and connected to the extruder head 3 perpendicularly to the mount face 21U, 21L by fixing the end of the cylinder 2B to the mount face.

In order to lead the rubber compounds (g) coming from the extruders 2a-2d to the die assembly 6, the head main body 4 is provided with preforming channels 24Ua, 24Ub, 24Lc and 24Ld as shown in FIG. 3.

Each preforming channel 24 comprises: an insert portion 24A opening at the mount face 21; and a transform portion 24B. The insert portion 24A has a circular sectional shape and extends coaxially with the cylinder hole 2H of the extruder 2. In this example, the insert portion 24A includes a screw-inserting part 24A1 of the substantially same diameter as the cylinder hole 2H into which the protruding end 2A1 of the screw 2A is inserted. The transform portion 24B extends from the insert portion 24A towards the downstream side gradually changing its sectional shape from the circle to a flat rectangle.

In case of the preforming channels 24Ua, 24Ub, the transform portion 24B is formed by forming depressions on both of the V-form side face and upper inner face 15 and 16 so as to extend to the end (downstream end) of the preforming channel opened at the inner face S of the die assembly mounting recess 5. Thus, when the central block separates from the lateral blocks, the transform portion 24B is parted or fully opened between the faces 15 and 16 which thus defines the parting plane.

In case of the preforming channels 24Lc, 24Ld, the transform portion 24B is formed by forming depressions on both of the lower inner face and upper face 17 and 19 so as to extend to the end (downstream end) of the preforming channel opened at the inner face S of the die assembly mounting recess 5. Thus, when the sub blocks separate from the lateral blocks, the transform portion 24B is parted or fully opened between the faces 17 and 19 which thus defines the parting plane.

As explained above, by moving the V-shaped central block 10 and sub blocks 13 to the respective open positions, the preforming channels 24 are split and opened largely in the transform portions 24B between the V-form side face and upper inner face 15 and 16 and between the lower inner face and upper face 17 and 19.

As the four extruders 2 are distributed two on each side of the head main body 4, it is possible to reduce the size and weigh of the head main body 4 to improve the handling and to reduce the equipment cost. Further, it is also possible to reduce the total volume of the preforming channels 24Ua, 24Ub, 24Lc and 24Ld to lessen the rubber compounds which remain in the channels and go to waste.

The larger extruders 2a and 2b which cause a higher inner pressure are connected to the upper mount faces 21U, and the smaller extruders 2c and 2d which cause a lower inner pressure are connected to the lower mount faces 21L.

The inner pressure in the upper preforming channels 24Ua and 24Ub causes a force to open the V-shaped central block 10, but, as the surfaces to be pressurized are provided on both sides of the block 10 and inclined downwards, the component forces applied to the block from both sides thereof are cancel each other, and a resultant force to move the V-shaped central block 10 upwards is greatly decreased.

With regard to the sub blocks 13, as the die assembly 6 is disposed tightly between the opposite side faces S3 and further the pivot points P of the sub blocks 13 are positioned below the position of the die assembly 6, the die assembly 6 functions as a stopper to prevent the sub blocks 13 from opening (rotating downwards) even when a large force exerts on the inner surface of the channels 24Lc and 24Ld of the sub block 13.

Thus, stopper, cramp and the like to stop the opening of the sub blocks 13 and V-shaped central block 10 can be reduced in number, size and weight. For that reason, the angle theta between the side faces 17A and 17B is set in a range of from 70 to 100 degrees. The angle alpha between the two V-form side faces 15 is set in a range of from 60 or 45 degrees. In the upper preforming channel 24Ua and 24Ub, the intersecting angle beta between the center line of the insert portion 24A and the side face 15 or 16 is set in a range of less than 60 degrees, preferably less than 45 degrees. In this example, the intersecting angle beta in the rightward channel 24Ua is the substantially same as tat in the leftward channel 24Ub.

In order to make the die assembly 6 smaller, the above-mentioned four preforming channels 24Ua, 24Ub, 24Lc and 24Ld are opened at two or more different faces of the recess 5.

Figure 5:
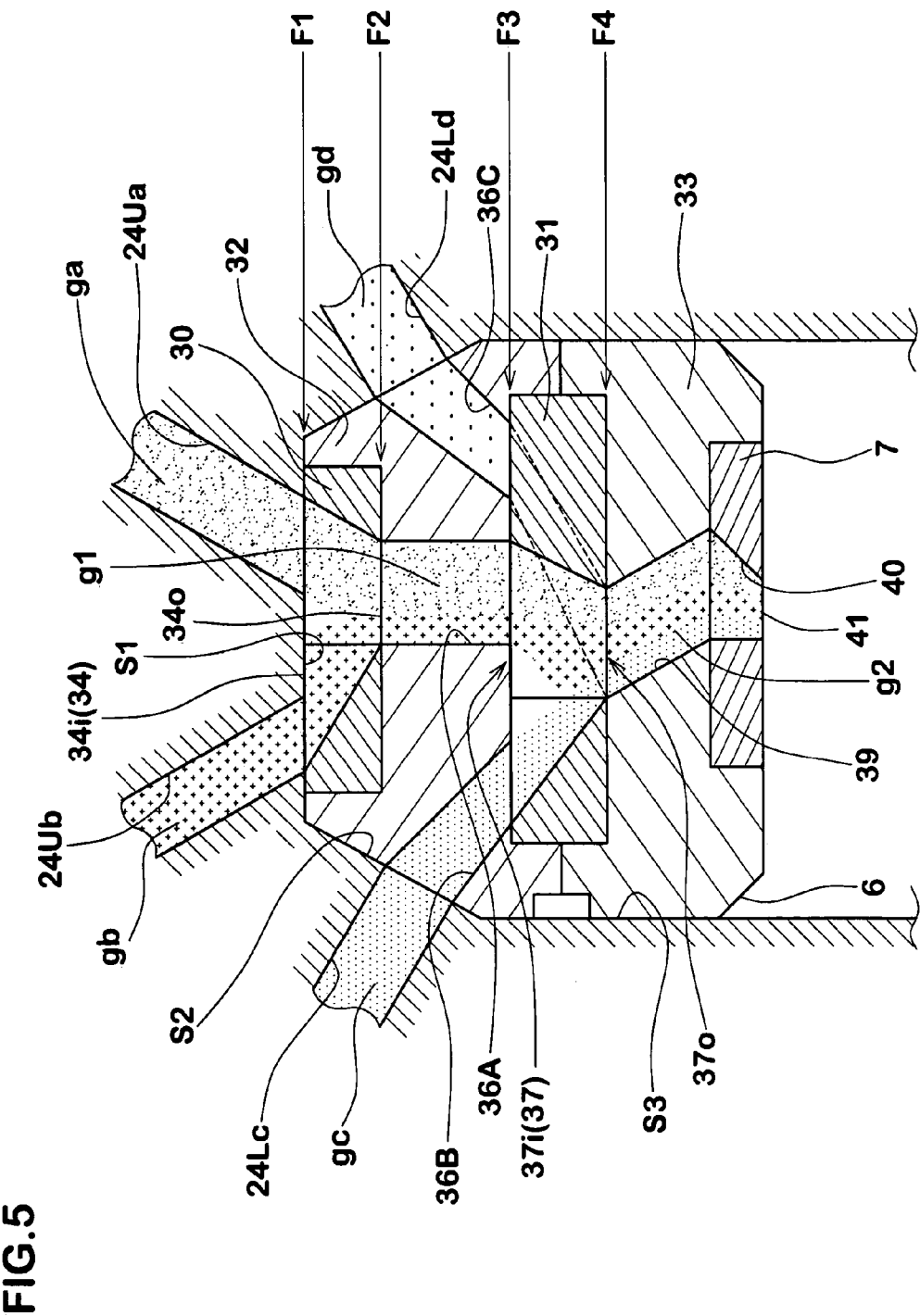
FIG. 5 is a cross sectional view of a die assembly attached to the head main body.

In this embodiment, as shown in FIG. 5, both of the upper preforming channels 24Ua and 24Ub are opened in the upper inner face S1, and the lower preforming channels 24Lc and 24Ld are opened in the respective oblique inner faces S2.

Figure 8:
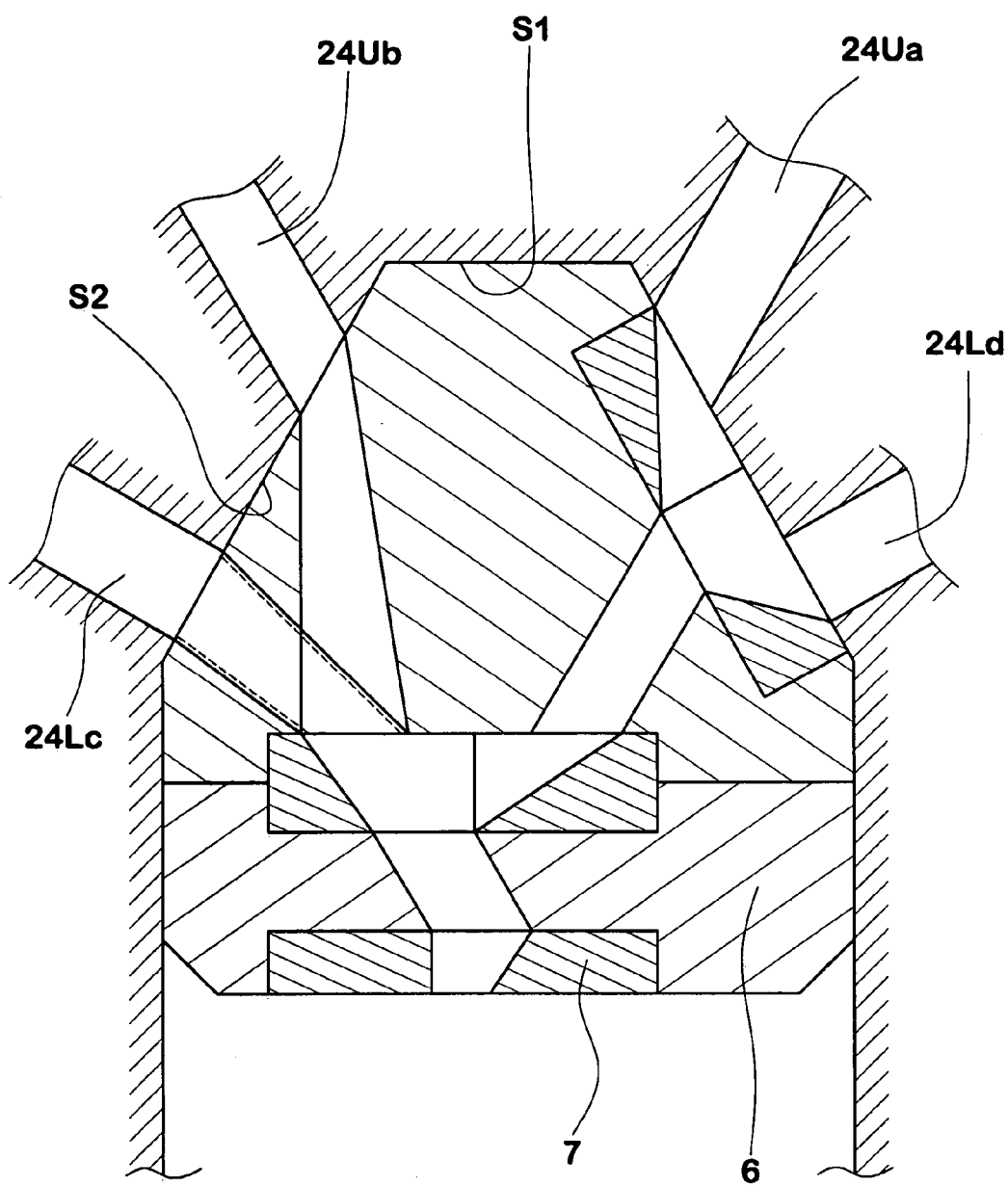
FIG. 8 is a cross sectional view of another example of a die assembly mounting recess and a die assembly.

FIG. 8 shows another example in which the four preforming channels 24Ua, 24Ub, 24Lc and 24Ld are opened in the two oblique inner faces S2.

The die assembly 6 is designed according to the strip to be made, and different assemblies 6 for example that for the tread rubber and that for the sidewall rubber are prepared to combine with the head main body 4 to make different strips in respect of the size, section arrangement (Ya, Yb, Yc, Yd), sectional shapes and the like.

The die assembly 6 has an outer shape adapted to the die assembly mounting recess 5. In this example, thus, it has faces contacting the uppermost inner face S1, oblique inner faces S2, and opposite side faces S3.

FIG. 5 shows a die assembly 6 used to form the tread rubber G1 shown in FIG. 9(a). The die assembly 6 is made up of an uppermost first die 30, a first die-support base 32, a second die 31, a second die-support base 33, and a final die 7 which are arranged in this order.

Figure 6A:
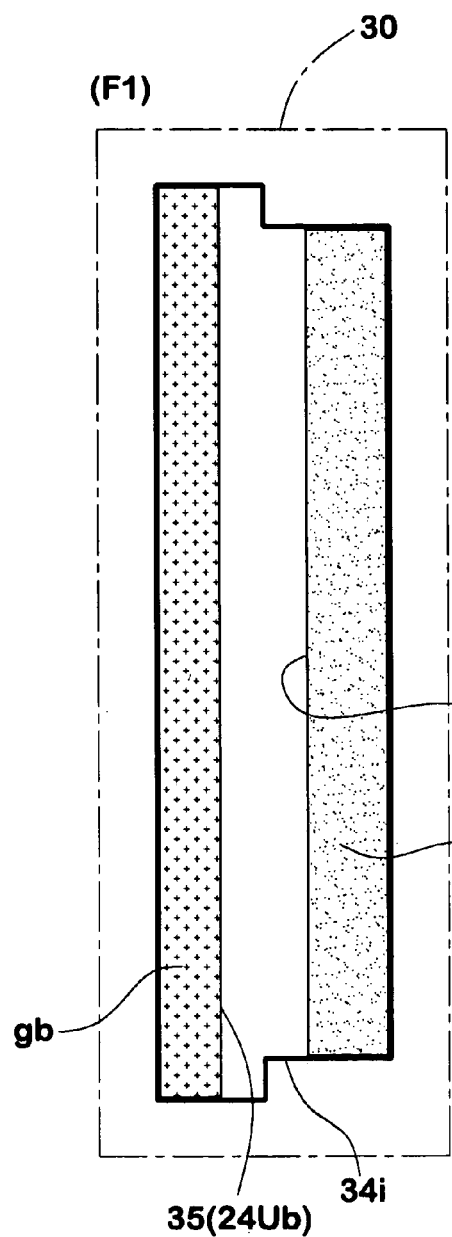
FIGS. 6(a) and 6(b) are diagrams showing an inlet and an outlet of the first die.
Figure 6B:
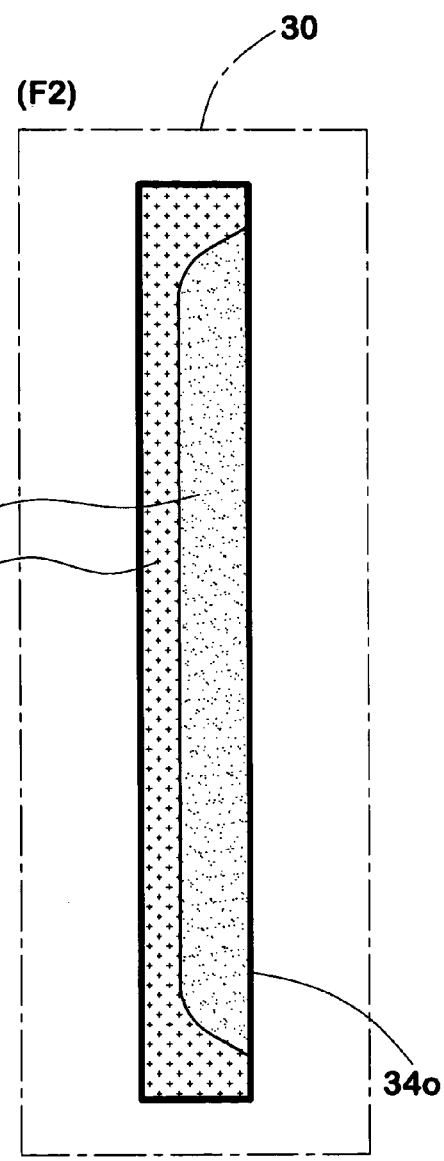

The first die 30 has a forming passage 34 through which the rubber compounds ga and gb coming into its inlet 34i (FIG. 6(a)) from the upper preforming channels 24Ua and 24Ub run and are united without being merged, and the resultant two-layered compound g1 is let out from its outlet 34o (FIG. 6(b)). FIG. 6(a) shows an arrangement of the inlet 34i and the outlets 35 of the upper preforming channels 24Ua and 24Ub at the position F1 of the upper end of the first die 30. FIG. 6(b) shows the cross sectional shape of the outlet 34o at the position F2 of the lower end of the first die 30.

The first die-support base 32 has:
a guide passage 36A which leads the two-layered compound g1 coming from the outlet 34o to an inlet 37i of the second die 31;
a guide passage 36B which leads the rubber compound gc coming from the lower preforming channel 24Lc to the inlet 37i; and
a guide passage 36c which leads the rubber compound gd coming from the lower preforming channel 24Ld to a pair of inlets 38 of the second die 31.

Figure 7A:
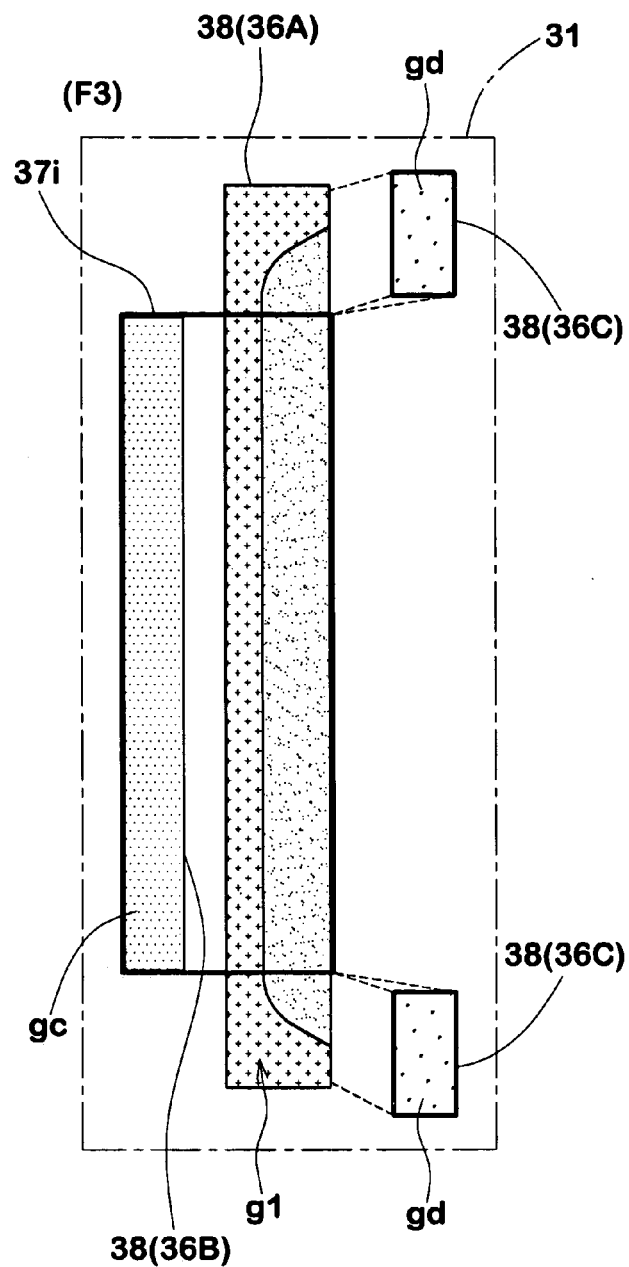
FIGS. 7(a) and 7(b) are diagrams showing a plurality of inlets and an outlet of the second die.
Figure 7B:
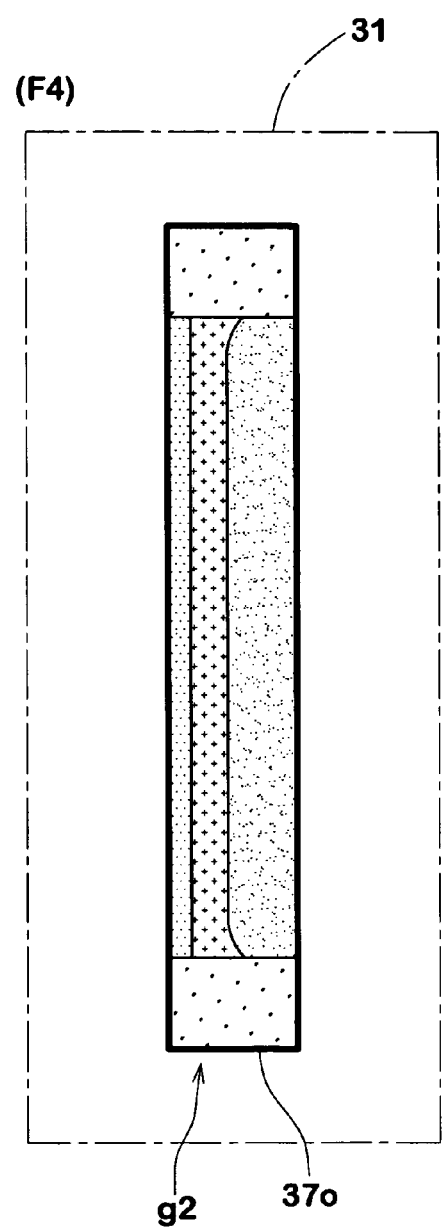

The second die 31 has a large inlet 37i and a pair of small inlets 38 (FIG. 7(a)) which are merged into one outlet 37o through a pair of channels as indicated in hidden line in FIG. 7(b). The rubber compounds g1 and gc coming from the guide passage 36A and 36B flow into the inlet 37i. The rubber compound gd coming from the guide passage 36c flows into the two inlets 38 and is led to both ends of the outlet 37o, whereby all the rubber compounds are united into a second rubber compound g2 wherein the rubber compounds g1 and gc are layered (thus forming three layers of ga, gb and gc), and the rubber compound gd is disposed at each end of the three-layered main portion as shown in FIG. 7(b). The second rubber compound g2 is let out from an outlet 37o. FIG. 7(a) shows an arrangement of the inlets 37i and 38 at the position F3 of the upper end of the second die 31. FIG. 7(b) shows the outlet 37o at the position F4 of the lower end of the second die 31.

The second die-support base 33 has a guide passage 39 which leads the second rubber compound g2 coming from the outlet 37o to the final die 7.

The final die 7 has a forming passage 40 which has an inlet at the upper end thereof into which the second rubber compounds g2 flows and an extruding nozzle at the lower end. The nozzle has a shape accord with the finished sectional shape of the tread rubber G1, and the tread rubber strip is extruded from the nozzle 41.

The invention claimed is:

1. An apparatus for manufacturing a strip of rubber compounds comprising
   four extruders of rubber compounds and
   a single extruder head having an extruding nozzle,
   the extruder head comprising
     an extruder die assembly and
     a main body provided with a recess in which said extruder die assembly is mounted,
   the main body composed of
     a pair of laterally-spaced lateral blocks each having an upper inner face and a lower inner face, and
     a central block disposed between the opposed upper inner faces of the lateral blocks, and
     a pair of laterally-spaced sub blocks disposed beneath the lateral blocks and having an upper face contacting said lower inner face,
   said central block having
     a bottom face and
     a pair of V-form side faces extending in a V-shaped formation down to lateral ends of the bottom face,
   said opposed upper inner faces of the lateral blocks extending in the same V-shaped formation as the V-form side faces so as to fit to the V-form side faces of the central block,
   the lateral blocks each provided with a tip end surface extending between the upper inner face and lower inner face, and the sub blocks each provided with an inner side face extending from the upper face, and said recess formed as an open-bottom recess by the tip end surfaces, the inner side faces and the bottom face,
   the lateral blocks each provided on the other side of the upper inner face and lower inner face with an upper mount face and a lower mount face on which two of the four extruders are respectively attached,
   an upper preforming channel extending from each of the upper mount faces to the recess and having a parting plane between the V-form side face and upper inner face, and
   a lower preforming channel extending from each of the lower mount faces to the recess and having a parting plane between the lower inner face and upper face, wherein
   said lateral blocks are both immovably fixed to a frame, and on one lateral side of the frame, two of said four extruders are disposed, and the remaining two extruders are disposed on the other lateral side of the frame,
   each said sub block is supported by a link one end of which is pivoted to one of the lateral blocks at a pivot point and the other end of which is fixed to the sub block, so that the sub block is movable around the pivot point from an upper closed position to a lower oven position, wherein
   at the upper closed position, the upper face of the sub block contacts with the lower inner face of the lateral block, and
   at the lower open position, the upper face separates from the lower inner face to open the lower performing channels by the parting plane between the lower inner face and upper face.

2. The apparatus according to claim 1, wherein
   the central block is movable in the up and down direction from a lower closed position to an upper open position, wherein at the lower closed position, the V-form side faces of the central block contact with the opposed upper inner faces of the lateral blocks and
   at the upper open position, the V-form side faces separate from the opposed upper inner faces to open the upper preforming channels by the parting plane between the V-form side face and upper inner face.

3. The apparatus according to claim 1, wherein
   in each of the lateral blocks, the upper mount face and the lower mount face have different inclinations.

4. The apparatus according to claim 1, wherein
   the upper preforming channels are opened in the bottom face, and
   the lower preforming channels are opened in the tip end surfaces, respectively.

5. The apparatus according to claim 1, wherein
   one of the upper preforming channels and one of the lower preforming channels are opened in one of the tip end surfaces.

6. The apparatus according to claim 1, wherein
   the pivot point of each said sub block is located at a position downward of said extruder die assembly so that the extruder die assembly mounted in the recess is inserted between the two sub blocks and hinders the movement of the sub blocks around the respective pivot points from the upper closed position towards the lower open position.

7. The apparatus according to claim 1, wherein
   the recess in which the extruder die assembly is mounted is provided with four outlet openings of the two upper performing channels and the two lower performing channels,
   the extruder die assembly has a plurality of inlet openings each connected to one said four outlet openings when mounted in the recess, and
   the extruder die assembly is provided with a plurality of passages extending from the respective inlet openings and merged into one passage within the extruder die assembly to open at the extruding nozzle.

* * * * *